Sept. 22, 1953 J. A. PADJEN 2,653,001
PORTABLE LAMP FOR VEHICLES
Filed June 30, 1952 2 Sheets-Sheet 2
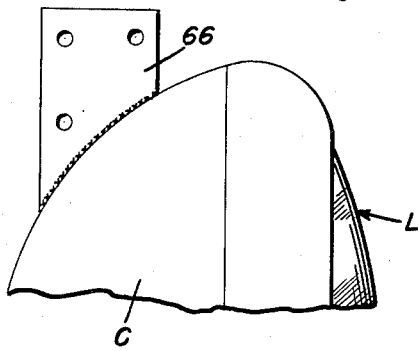
Fig. 4
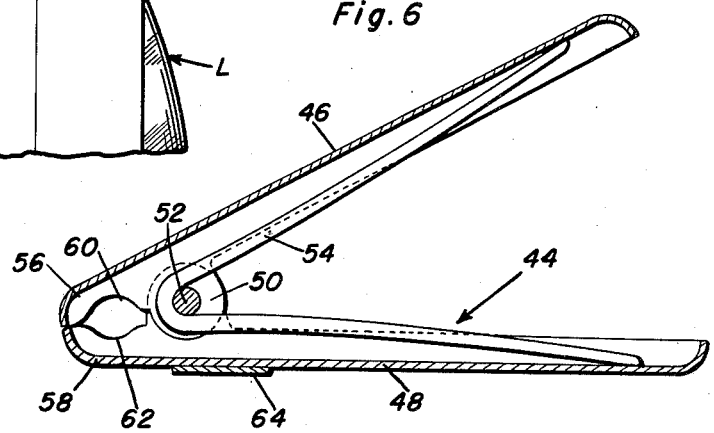
Fig. 6
Fig. 8
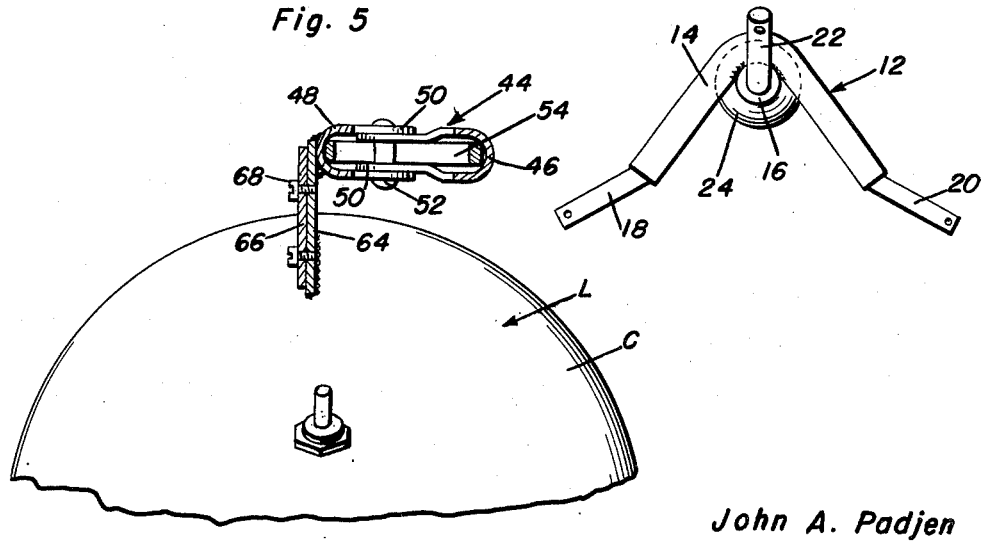
Fig. 5
John A. Padjen
INVENTOR.
BY Patented Sept. 22, 1953

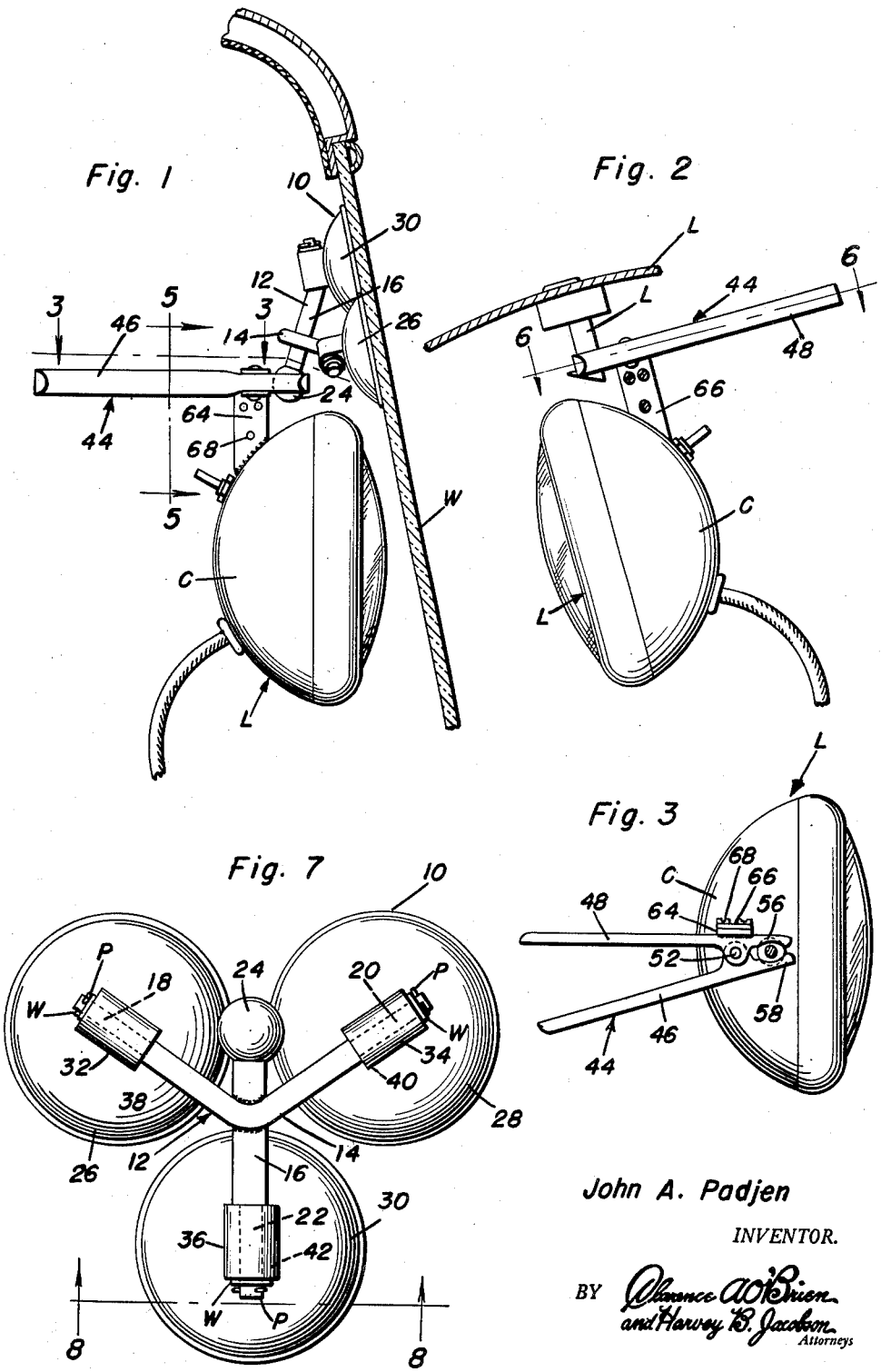

2,653,001

UNITED STATES PATENT OFFICE 2,653,001

PORTABLE LAMP FOR VEHICLES

John A. Padjen, Evanston, Wyo.

Application June 30, 1952, Serial No. 296,367

4 Claims. (Cl. 248—206)

1

This invention relates to new and useful improvements in utility lights and the primary object of the present invention is to provide a portable lamp for vehicles having means whereby the same may be attached to various portions of a vehicle in a convenient manner.

Another important object of the present invention is to provide a portable lamp for vehicles involving novel and improved mounting means, whereby the lamp may be supported upon the windshield of a vehicle to be used as a search light or wherein the lamp may be attached to the latch of a trunk lid to function as a warning lamp while directing light rays rearwardly so that the rear tires of a vehicle may be changed if required.

A further object of the present invention is to provide a portable lamp for vehicles involving a clamp attached to a lamp casing and swivelly engaging a part of an attaching means so that the lamp may be moved to a desired position for illuminating various areas.

A still further aim of the present invention is to provide a portable lamp for vehicles that is extremely simple and practical in construction, strong and reliable in use, efficient and durable in operation, inexpensive to manufacture, small and compact in structure, and otherwise well adapted for the purposes for which the same is intended.

Other objects and advantages reside in the details of construction and operation as more fully hereinafter described and claimed, references being had to the accompanying drawings forming part hereof, wherein like numerals refer to like parts throughout, and in which:

Figure 1 is a fragmentary vertical sectional view of a vehicle windshield and showing the present invention supported thereon;

Figure 2 is a fragmentary vertical sectional view of a vehicle trunk lid with the clamp of the present invention gripping the latch for the lid;

Figure 3 is a horizontal section view taken substantially on the plane of section line 3—3 of Figure 1;

Figure 4 is an enlarged fragmentary view of Figure 1 and showing the attaching plate that is welded to the lamp casing;

Figure 5 is an enlarged vertical sectional view taken substantially on the plane of section line 5—5 of Figure 1;

Figure 6 is an enlarged longitudinal sectional view taken substantially on the plane of section line 6—6 of Figure 2, the clamp being removed from the latch and the lamp casing;

Figure 7 is a plan view of the clamp attaching

2 or anchoring means forming part of the present invention and removed from the clamp; and Figure 8 is an elevational view of the spider member used in the invention taken substantially on the plane of section line 8—8 of Figure 7 with the suction cups removed.

Referring now to the drawings in detail, wherein for the purpose of illustration, there is disclosed a preferred embodiment of the present invention, the numeral 10 represents a clamp attaching or anchoring means generally, as shown in Figure 7, including a spider member 12 (Figure 8) that comprises a rigid V-shaped arm-forming part 14 whose apex is fixed by welding or the like to an intermediate portion of an arm-forming rod 16. The outer reduced ends 18 and 20 of arm forming part 14 are bent outwardly relative to each other and the reduced end 22 of the rod 16 also is bent outwardly. The other end of rod 16 is fixed to a ball element 24.

A gang, preferably three, suction cups 26, 28, and 30 form part of the attaching means 10. The cups 26, 28 and 30 are provided with central shank portions 32, 34 and 36, respectively, having transverse apertures 38, 40 and 42 that receive the end portions 18, 20, 22, respectively. The shank portions abut the shoulders formed at the inner extremities of the end portions 18, 20 and 22. The outer extremities of the end portions 18, 20 and 22 project outwardly from the shank portions and are formed with transverse apertures that receive cotter pins P. Washers W are disposed about the outer extremities of the end portions 18, 20 and 22 behind the pins P and rest against the shank portions.

A clamp 44 is removably secured to the attaching means 10. This clamp comprises a pair of elongated channel-shaped levers 46 and 48 whose open sides face each other. Overlapping ears 50 at the forward portions of the levers 46 and 48 are connected together by a pivot 52 that extends into the apex of a V-shaped spring 54. The ends of the spring 54 are received in the levers 46, 48 and engage the rear ends thereof to urge the jaw-forming forward ends 56 and 58 of the levers toward each other.

The jaw-forming ends 56 and 58 are engaged over the ball element 24 and the side edges or flanges of the jaw-forming ends 56 and 58 are formed with concave recesses 60 and 62 that will define edges for contacting the periphery of the ball element 24 to aid in retaining the clamp adjusted on the ball element.

A plate 64 is fixed by welding or the like to the lever 48 and is disposed in juxtaposition with the plate 66 welded to the casing C of a preferably seal beam lamp L of known structure. The plates 64 and 66 are formed with registering apertures that receive fasteners 68 whereby the plates are held in juxtaposition.

The suction cups 26, 28, 30 may be applied to a vehicle windshield W with the lamp facing forwardly and disposed behind the windshield to function as a search light. The lamp may be swivelled to any desired position by the driver using the clamp 46 as a handle. The suction cups 26, 28 and 30 may also be attached to any other portion of the vehicle where light is desired.

When the clamp is removed from the attaching means 10, the clamp may engage on the latch La of a trunk lid Li so that the lamp may face rearwardly when the trunk lid is raised to provide a warning device for approaching motorist and to also provide light for the changing of tires and the like.

The conductors for the lamp may be attached to a plug that is insertable into the lighter receiving socket of a vehicle dash panel or the lamp may be electrically connected to the battery of a vehicle by any suitable means.

Having described the invention, what is claimed as new is:

1. A lamp holder for vehicles, said holder comprising three suction cups each having a shank portion provided with a transverse aperture, a rigid spider member having fixedly joined arms held in said apertures and spacing said cups equidistant from each other, a ball element fixed to one of said arms, and a clamp including a pair of socket-forming jaws gripping the ball element and having means for attachment to a lamp casing.

2. A lamp holder for vehicles, said holder comprising a lower pair of suction cups and an upper suction cup each having a shank portion provided with a transverse aperture, a rigid spider member having permanently fixedly joined arms held in said apertures, a ball element fixed to one of said arms and intersecting a plane between the centers of the lower suction cups, and a clamp including a pair of channel shaped jaws facing each other and defining a socket receiving the ball element, said clamp including means for attachment to a lamp casing.

3. A lamp holder for vehicles, said holder comprising a plurality of suction cups each having a shank portion with a transverse aperture, a rigid spider member having a plurality of arms fixedly secured together, said arms being provided with reduced outer end portions received in said apertures, means securing said arms to the shank portions, a ball element fixed to said spider member, and a lamp-attached clamp including spring pressed jaws gripping the ball element, adjacent suction cups being spaced equidistant from each other.

4. A lamp holder for vehicles, said holder comprising a lower pair of suction cups and an upper suction cup disposed between and above the lower suction cups, each of said upper and lower suction cups having a shank portion with a transverse aperture, a rigid spider member having a plurality of arms, said arms being provided with reduced outer end portions received in said apertures, means securing said arms to the shank portions and retaining the lower cups spaced equidistant from each other and from the upper cup, a ball element fixed to said spider member and intersecting an imaginary plane through the centers of the lower cups, a clamp including a pair of pivotally connected levers each having a jaw at one end and a spring engaging the levers and urging the jaws toward each other, said jaws gripping the ball element, a first plate fixed to one of the levers, a second plate adapted to be permanently fixed to a lamp casing, and fasteners removably securing said plates in juxtaposition.

JOHN A. PADJEN.

References Cited in the file of this patent

UNITED STATES PATENTS

| Number | Name | Date |
|---|---|---|
| 1,405,221 | Jenkins | Jan. 31, 1922 |
| 1,483,640 | Manning | Feb. 12, 1924 |
| 1,694,235 | Schoenfelder | Dec. 4, 1928 |
| 1,754,366 | Lissy | Apr. 15, 1930 |
| 2,558,911 | Penn | July 3, 1951 |
| 2,602,617 | Muth | July 8, 1952 |
| 2,633,321 | Coulter | Mar. 31, 1953 |